J. G. SCHREUDER & V. K. SPICER.
APPARATUS FOR AUTOMATICALLY CONTROLLING THE SPEED OF TRAINS.
APPLICATION FILED AUG. 8, 1907.
903,417.
Patented Nov. 10, 1908.
3 SHEETS—SHEET 3.
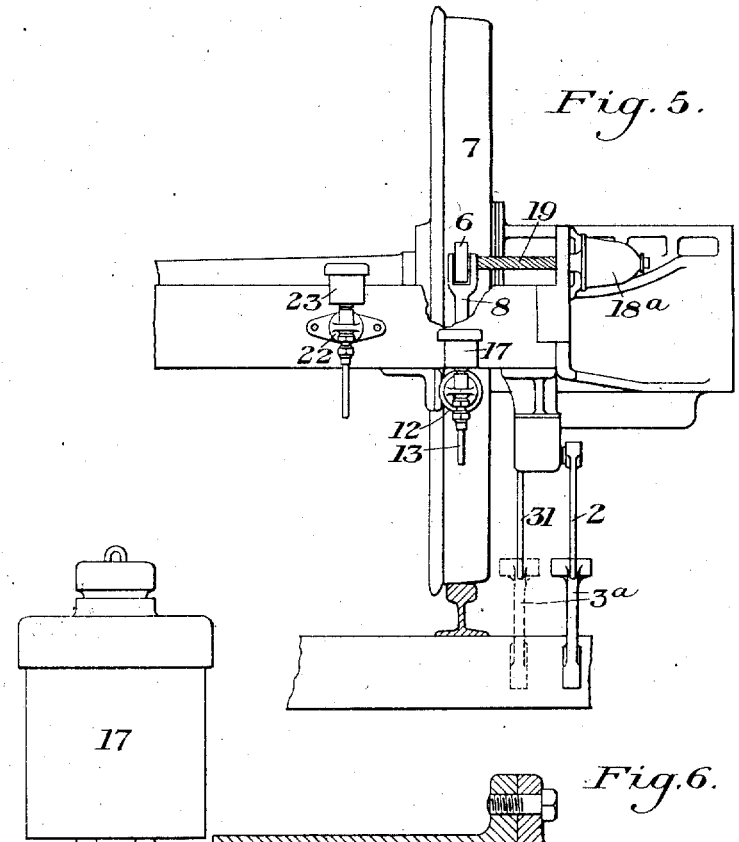
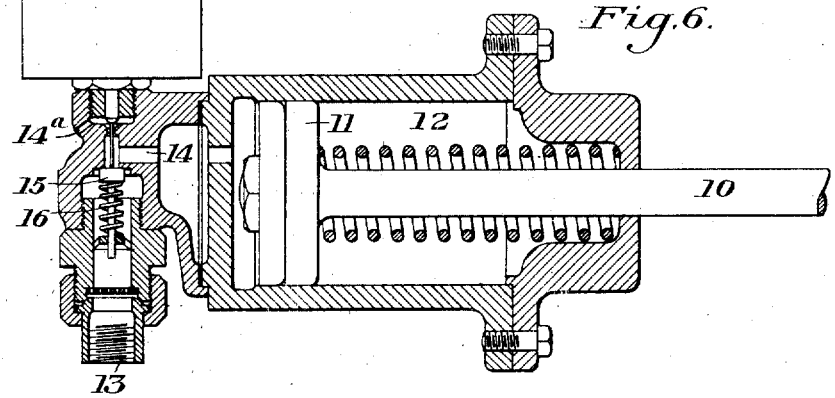
WITNESSES
R A Balderson
W W Swartz
INVENTORS
J. G. Schreuder,
V. K. Spicer,
by Bakewell, Byrnes & Parmelee
their Attys.

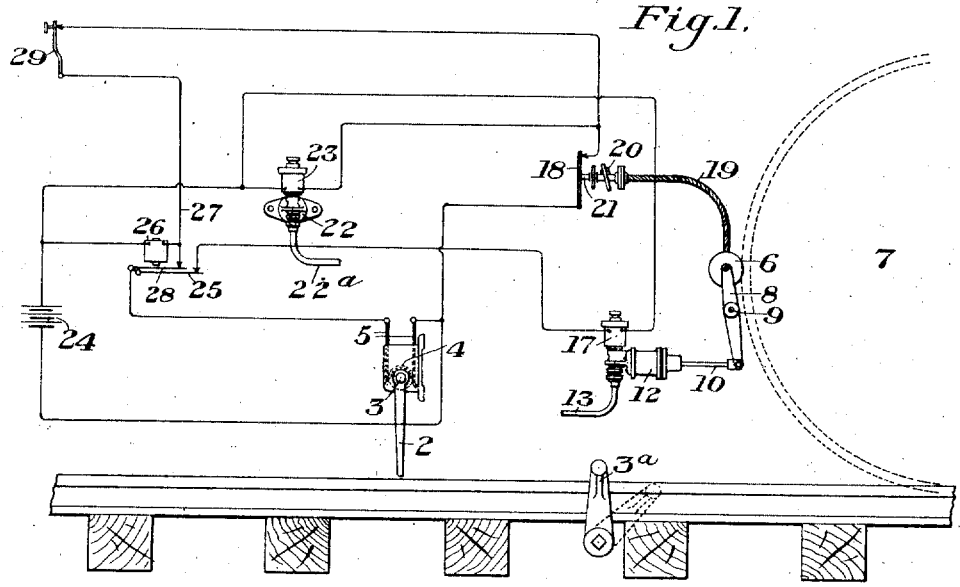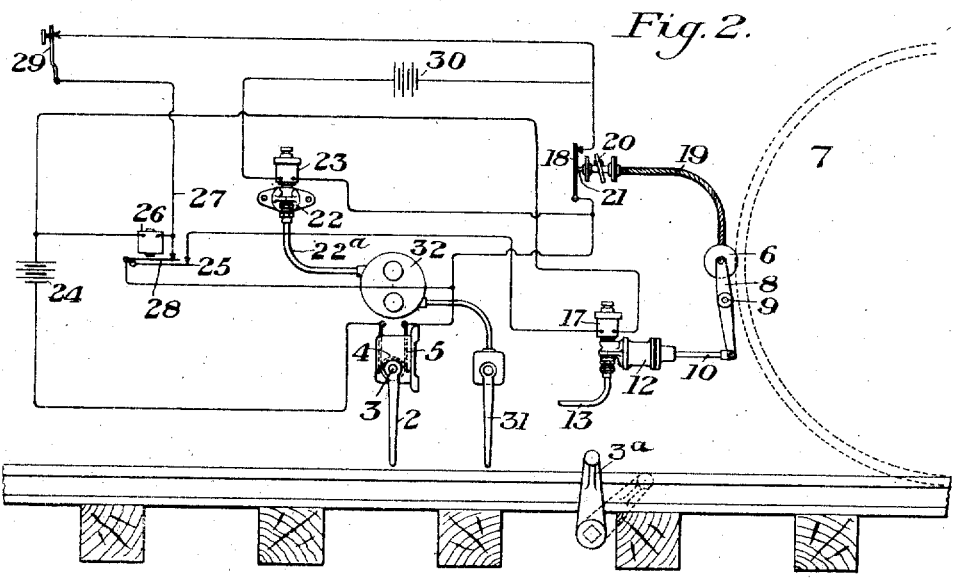

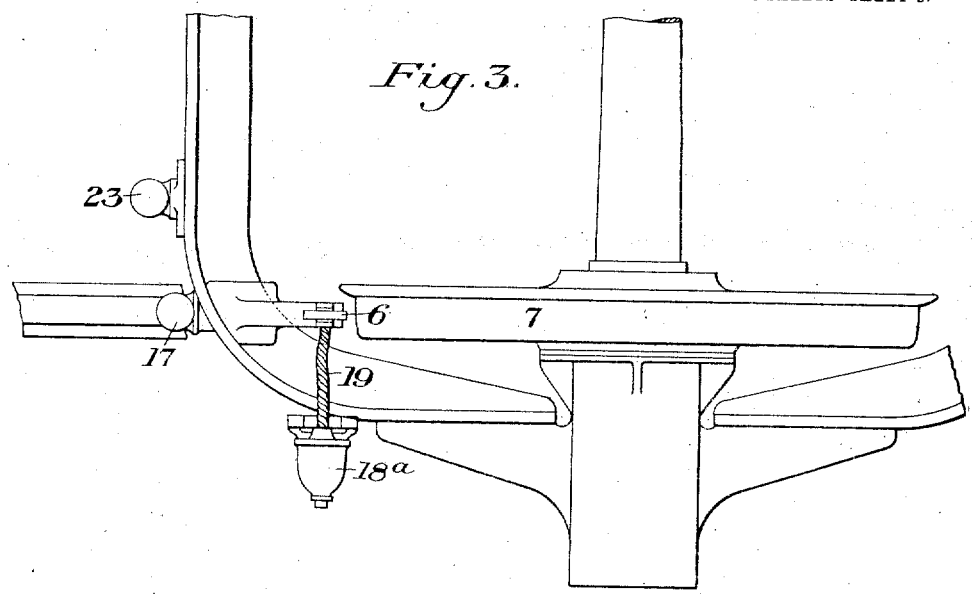
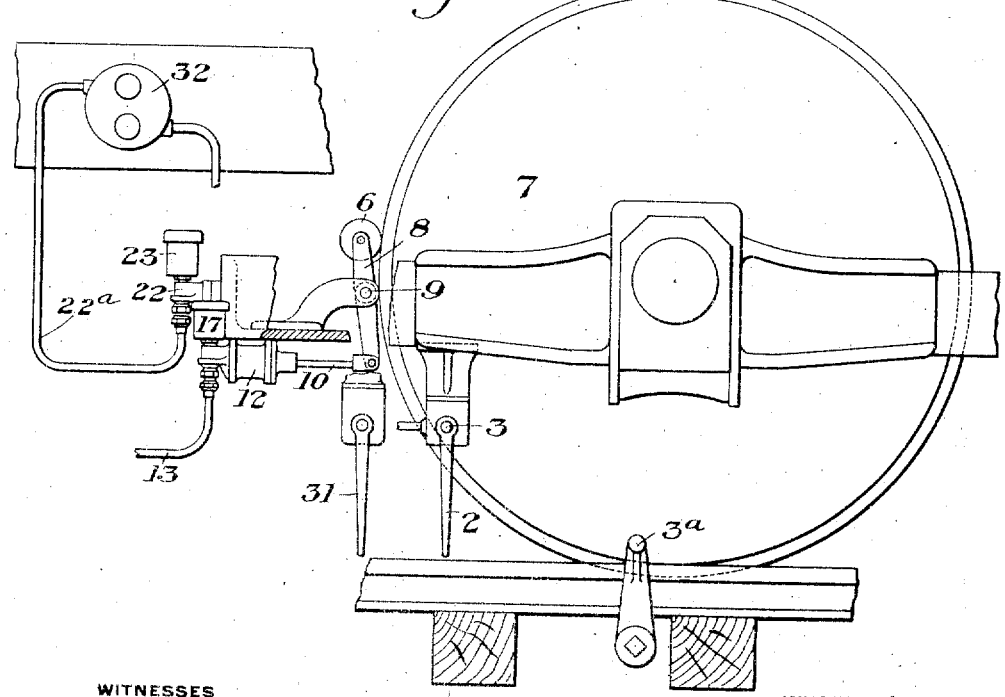

UNITED STATES PATENT OFFICE.

JENS G. SCHREUDER, OF EDGEWOOD PARK, PENNSYLVANIA, AND VIBE K. SPICER, OF CHICAGO, ILLINOIS, ASSIGNORS TO THE UNION SWITCH & SIGNAL COMPANY, OF SWISSVALE, PENNSYLVANIA, A CORPORATION OF PENNSYLVANIA.

APPARATUS FOR AUTOMATICALLY CONTROLLING THE SPEED OF TRAINS.

No. 903,417.   Specification of Letters Patent.   Patented Nov. 10, 1908.

Application filed August 8, 1907. Serial No. 387,600½.

*To all whom it may concern:*

Be it known that we, JENS G. SCHREUDER, of Edgewood Park, Allegheny county, Pennsylvania, and VIBE K. SPICER, of Chicago, Cook county, Illinois, have invented a new and useful Apparatus for Automatically Controlling the Speed of Trains, of which the following is a full, clear, and exact description, reference being had to the accompanying drawings, forming part of this specification, in which—

Figures 1 and 2 are diagrammatic views illustrating different embodiments of our invention; Fig. 3 is a plan view showing the speed governor; Fig. 4 is a side view showing the speed governor and the trip and valve mechanisms; Fig. 5 is an end view of the same; and Fig. 6 is a detail sectional view of means for throwing the speed governor into and out of operation.

Our invention has relation to the automatic control of railway trains or other vehicles, in which the engine or other vehicle, is provided with a trip actuating mechanism for operating the brakes to bring the train to a full stop, and with other trip-actuating mechanism for effecting a service application of the brakes, the latter mechanism being inoperative unless the speed of the train is in excess of a predetermined limit. A system of this kind is more fully described and claimed in our application, Serial No. 386,932 of even date herewith.

The present invention relates more particularly to the speed governing device, and to means for moving the same into and out of operation, the apparatus controlled by said device being so arranged that its operation is ineffective unless the speed of the train is in excess of the predetermined limit.

Referring to Fig. 1, the numeral 2 designates a depending trip arm, which is pivoted to the frame of the locomotive or other vehicle at 3, and which is designed to engage with track trips 3ᵃ along the railroad at the desired points. The pivot of the trip arm 2 carries a contact 4, which is normally engaged by two contact arms 5, which form a part of an electric circuit hereinafter described, said contacts being so arranged, as shown, that a slight movement of the trip in either direction from its normal position will break the circuit at this point.

6 designates a friction wheel, which is designed to be moved into and out of frictional contact with one of the wheels 7 of the engine or other vehicle. This wheel is shown as mounted upon one arm of a lever 8 pivoted at 9, and whose other arm is connected by a rod 10 with a piston 11 which works in an air cylinder 12, (see Fig. 6). This cylinder is connected with the fluid pressure supply pipe 13 by a port 14 having a valve 15, said valve being held in closed position by a spring 16 and opened by an electromagnet 17 which, when energized, overcomes the action of the said spring. The shaft of the friction wheel 6 is connected in any suitable manner with a centrifugally acting electric switch 18 inclosed in a suitable casing 18ᵃ. In the drawings, we have shown this connection as effected by means of a flexible shaft 19. The centrifugal device which controls the switch 18 may be any suitable form of centrifugal governor, such as an ordinary ball governor. In the form shown, it consists of an eccentrically pivoted weight member 20 having a normal oblique position and tending to gradually assume a vertical position as its speed of rotation increases. this movement causing an endwise movement of the spindle 21 to open the switch 18.

22 designates a normally closed valve, which is connected with the train brake pipe 22ᵃ, and which when opened is designed to allow air to exhaust from said pipe to effect a predetermined amount of reduction in the train pipe pressure to thereby obtain a service application of the brakes. This valve is normally held closed by an electromagnet 23. The valve 22 may be any well-known form of valve for the purpose.

The circuit of the magnet 23 is closed through the movable switch member 18, 24 indicating a battery or other source of supply for said circuit. The circuit of the magnet 17 is completed through the armature 25 of a relay magnet 26, and the circuit which includes the trip-operated breaker 5 is also closed through the armature 25. The coil 26 is connected on one side with one terminal of the battery, and upon the other side to a conductor 27 having one branch which is closed by a second armature 28 of the coil 26, and another branch which leads through a hand switch 29 and through the switch 18.

The operation is as follows:—The friction wheel 6 is normally held out of contact with the locomotive or car wheel by the pressure of the air in the cylinder 12. When the trip arm 2 engages with one of the track trips, the circuit of the magnet 17 is broken at the contacts 5, thereby deënergizing said magnet. This closes the valve 15 and allows the air to exhaust from the cylinder 12 through the port 14ª and the spring at once throws the wheel 6 into frictional contact with the car wheel 7. If the speed of the car is below the predetermined limit, the switch 18 will remain closed and the magnet 23 and valve 22 will not be affected. The speed governor will not be affected, and the return of the arm 2 to its normal position will reënergize the magnet 17 and again admit air to the cylinder 12 to throw the wheel 6 out of operation. If, however, the speed of the train exceeds the predetermined limit to which the governor member 20 is set, the switch 18 is immediately opened. This breaks the circuit of the magnet 23 and allows air to escape from the valve 22 to effect the service application of the brakes. The opening of the switch 18 also deënergizes the relay magnet 26 and both its armatures 25 and 28 open. If the hand switch 29 is open, the magnet 26 cannot be reënergized until this switch is closed, and then not unless the speed has been reduced to such an extent as to close the switch 18. If this switch has been returned to closed position by the governor, the closing of the hand switch will energize the magnet 26, causing it to attract its armatures 25 and 28. The closing of the armature 25 will reënergize the magnet 17, thereby admitting air to the cylinder 12 to throw the wheel 6 out of operative position. The closing of the armature 28 completes the circuit of the relay magnet 26 independently of the hand switch 29, so that the subsequent opening of such switch by the engineer will have no effect.

From the foregoing it will be noted that the circuit of the magnet 23 is opened only when the speed of the train is such as to open the switch 18. At other times the operation of the trip arm 2 simply momentarily throws the speed governor into operation without any other effect, and the latter is at once thrown out again as soon as the trip arm is restored to its normal position. If, however, the speed is such as to open the valve 18, the speed governor remains in operation until the speed has been reduced sufficiently to close the switch 18.

The arrangement shown in Fig. 2 is substantially the same as that shown in Fig. 1, except that a separate battery 30 is employed for the circuit of the magnet 23, this circuit being controlled by the speed governor control switch 18. In this arrangement, we have also indicated a trip 31 designed to operate valve mechanism 32 for the purpose of bringing the train to a full stop. We have also shown the pipe 22ª from the valve 22 as connected into this valve mechanism, which operates to effect a service application of the brakes when the valve 22 is opened.

The advantages of our invention result from the fact that by its use it is impossible for an engineer to run by a given point at speed in excess of that required by the rules or by the temporary road conditions. The track trips 3 may be operated in connection with the home and distant signal movements, so as to be moved into and out of position by the movement of the signals, as fully described and claimed in our application above referred to; or said trips may be placed either temporarily or permanently at any desired points along the road, as at curves or other places where it is desirable for safety to reduce the running speed.

It will be obvious to those skilled in the art that various changes may be made in the mechanical construction and arrangement of the various parts, the drawings being largely diagrammatic and illustrating the broad features of our invention. Thus, various devices may be employed for controlling the circuits and for throwing the speed governor into and out of operative position.

What we claim is:—

1. In apparatus for train control, a normally closed controlling valve, a train-driven speed actuated governor, connections controlled by said governor for effecting the opening of the valve and trip actuated means for throwing the governor into operation; substantially as described.

2. In apparatus for train-control, a controlling valve, an electro-magnet for operating said valve, a switch controlling the circuit of the magnet, a speed governor for operating said switch, and means for throwing the speed governor into and out of operation under predetermined conditions; substantially as described.

3. In apparatus for train-control, a controlling valve, a speed-operated device for controlling the operation of said valve, a motor for throwing the speed-actuated device into and out of operation, and a trip for controlling the motive device; substantially as described.

4. In apparatus for train-control, a normally closed controlling valve, a magnet for operating said valve, a controlling switch for the circuit of the magnet, speed-governed means for operating the said switch, and trip-actuated means for moving the speed-controlled means into operative position; substantially as described.

5. In apparatus for train-control, valve mechanism for effecting a service application of the brakes, a speed-governed device for controlling the operation of the valve mechanism, and a trip for controlling the operation of the speed-governed device; substantially as described.

6. In apparatus for train control, a controlling device, a train driven governor, connections controlled by said governor for shifting the position of said device, trip actuated means for throwing the governor into operation and means whereby said governor is thrown out of operation without shifting the controlling device when the speed of the train is below a predetermined rate; substantially as described.

7. In train controlling apparatus, a controlling device, a speed actuated governor having connections for shifting said device when the speed of the train is above the predetermined limit, trip mechanism for throwing the governor into operation, and means for throwing the governor out of operation when the speed is below the predetermined rate; substantially as described.

8. In train-controlling apparatus, a controlling device, a speed actuated governor driven by the train, and having connections to be operated thereby to shift the controlling device, trip actuated means for throwing the governor into driving connection with a moving part of the train, and means depending upon the speed of the train for determining the length of time such driving connection is maintained; substantially as described.

9. In apparatus for train control, a controlling device, a speed actuated governor for shifting said device, means for normally holding the governor inoperative, trip actuated means for throwing the governor into action at any desired point along the track, and means controlled by the speed of the train whereby the governor will not act to shift the controlling device unless the speed of the train exceeds a predetermined rate; substantially as described.

10. In apparatus for train control, a controlling device, a speed actuated governor, a motive device for throwing the speed actuated governor into and out of operation, a normally closed electric circuit including means for controlling the operation of the motive device, trip actuated means for opening and closing the said circuit, an electric circuit controlled by the governor, and means controlled by the last named circuit for shifting the controlling device; substantially as described.

11. In apparatus for train control, a device for controlling the speed of the train, an electric circuit having a magnet for shifting the position of said device, a centrifugal governor having a driving connection with a moving part of the train, a motive device for controlling the said driving connection, a second electric circuit having a magnet therein which controls the operation of the motive device, and a track-actuated trip device arranged to open and close the last named circuit; substantially as described.

12. In apparatus for train control, a device for controlling the speed of the train, an electric circuit having a magnet for shifting the position of said device, a centrifugal governor arranged to open and close the said circuit, a driving connection between said governor and a moving part of the train, a motive cylinder having therein a piston and spring for throwing the driving connection into and out of operation, an electric circuit having a magnet which controls the admission of power to said cylinder, and a track operated trip device for opening and closing the last named circuit; substantially as described.

In testimony whereof, we have hereunto set our hands.

JENS G. SCHREUDER.
VIBE K. SPICER.

Witnesses as to Jens G. Schreuder:
C. C. WHITE,
JAMES CHALMERS, Jr.

Witnesses as to Vibe K. Spicer:
GEO. MARLOFF,
LEONARD W. NOVANDER.